(12) United States Patent
Mason et al.

(10) Patent No.: US 8,556,523 B2
(45) Date of Patent: Oct. 15, 2013

(54) OPTICAL TRANSCEIVER WITH POLARITY INVERSION

(75) Inventors: Thomas Beck Mason, San Jose, CA (US); Wei-Chiao Fang, Menlo Park, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 437 days.

(21) Appl. No.: 12/984,502

(22) Filed: Jan. 4, 2011

(65) Prior Publication Data

US 2011/0188863 A1 Aug. 4, 2011

Related U.S. Application Data

(60) Provisional application No. 61/301,180, filed on Feb. 3, 2010.

(51) Int. Cl.
*G02B 6/36* (2006.01)
(52) U.S. Cl.
USPC .......................................................... 385/88

(58) Field of Classification Search
None
See application file for complete search history.

(56) References Cited

U.S. PATENT DOCUMENTS

| 5,369,656 A | 11/1994 | Ackley et al. ................. 398/141 |
| 6,794,724 B2 * | 9/2004 | Tanikoshi et al. ............. 257/432 |
| 2008/0080577 A1 * | 4/2008 | Nguyen ..................... 372/38.02 |
| 2010/0325298 A1 * | 12/2010 | Nelson .......................... 709/229 |

* cited by examiner

*Primary Examiner* — Sung Pak
(74) *Attorney, Agent, or Firm* — Matthew A. Pequignot; Pequignot + Myers LLC

(57) ABSTRACT

An optical transceiver that includes a modification that prevents interoperability with standard transceivers, while enabling them to work in the same slots and equipment as standard transceivers, provided that they are interoperating with a similarly modified transceiver on the other end of the optical link. Ideally, the polarity of the data in both the transmit and receive direction is inverted resulting in valid data for a link when a pair of modified modules are used and invalid data when a modified module is used with a standard fiber optic transceiver. The function is otherwise transparent to the host equipment.

26 Claims, 8 Drawing Sheets

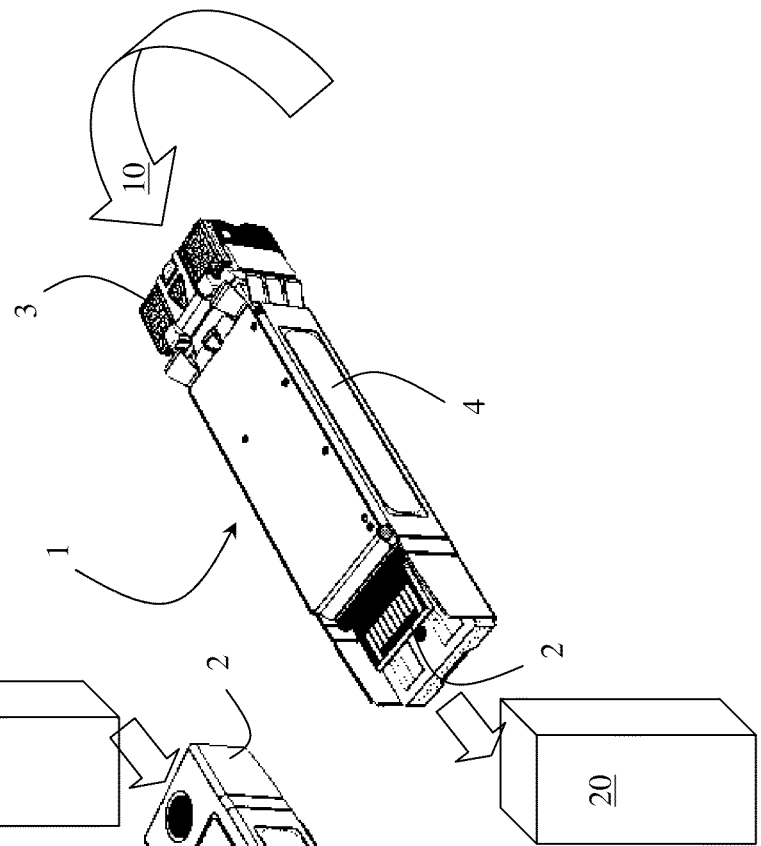
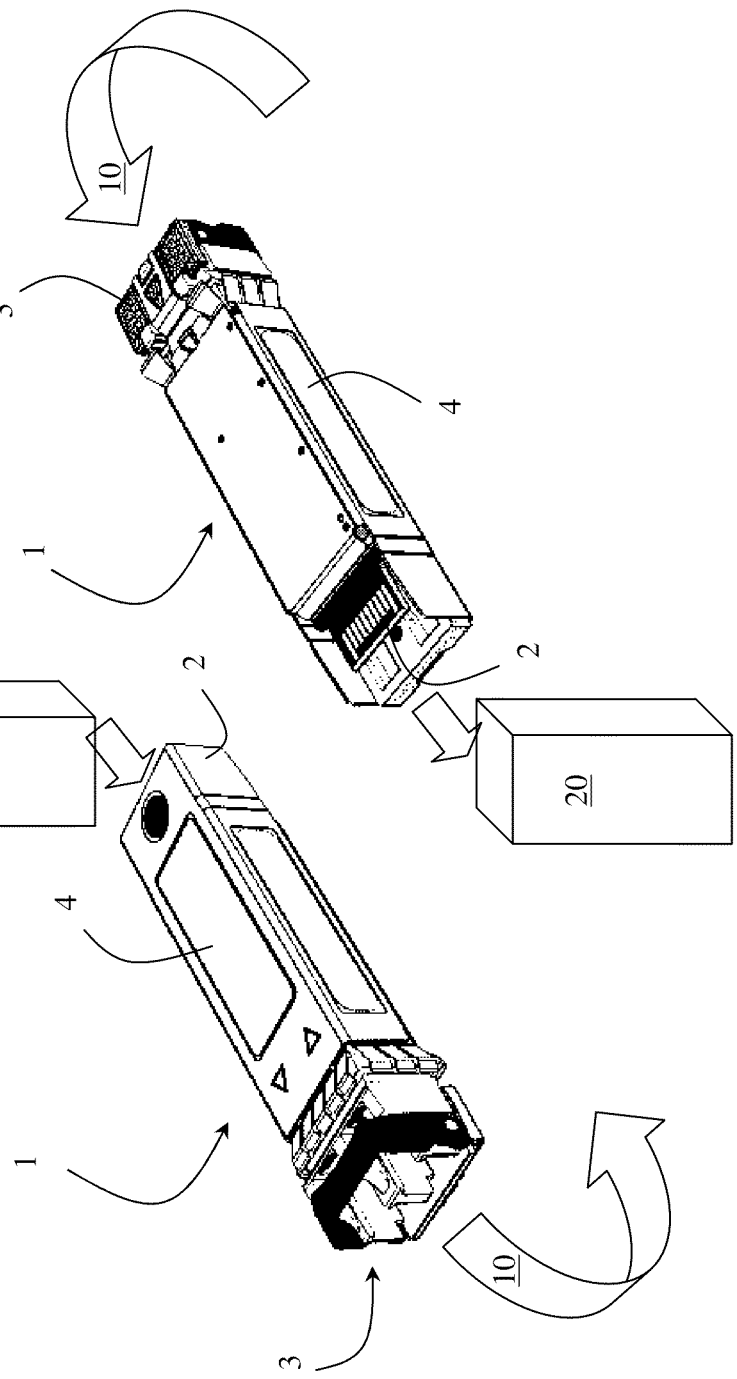

US 8,556,523 B2

OPTICAL TRANSCEIVER WITH POLARITY INVERSION

CROSS-REFERENCE TO RELATED APPLICATIONS

The present invention claims priority from U.S. Patent Application No. 61/301,180 filed Feb. 3, 2010, which is incorporated herein by reference.

TECHNICAL FIELD

The present invention relates to an optical transceiver, and in particular to an optical transceiver which is interoperable with other matching transceivers in standard optical links, but is inoperable with conventional transceiver modules.

BACKGROUND OF THE INVENTION

A transceiver is an electro-optic device that includes both a receiver optical sub-assembly (ROSA), which receives optical signals received from an optical network and converts them into electrical signals for reception by a host device, and a transmitter optical sub-assembly (TOSA), which converts electrical signals from the host device into optical signals for transmission over the optical network. The TOSA and ROSA share common circuitry and a single housing.

Conventional transceiver modules conform to multi-source agreements (MSA) so that any transceiver module of a known form factor can communicate with any other transceiver of the like form factor across an optical network. MSA transceivers can also be used interchangeably in host systems using the standard cage designs and electrical connectors. Examples of transceivers, which are subject to MSA's include GBIC, SFP, Xenpack, X2 etc.

Certain networks include custom transceiver solutions provided by modified transceivers, which only function properly if another modified transceiver is at the other end of the optical link. Accordingly there is a desire to provide modified transceivers, which only work with other modified transceivers, but operate within the mechanical and electrical specifications of existing MSA agreements.

An object of the present invention is to overcome the shortcomings of the prior art by providing a transceiver which is inoperable with existing standard transceivers yet uses essentially similar technology and link specifications to the standard transceiver.

SUMMARY OF THE INVENTION

Accordingly, the present invention relates to an opto-electronic transceiver device comprising:

a housing for mounting in a host device;

a printed circuit board (PCB) mounted in the housing including Rx+ and Rx− inputs, and Tx+ and Tx− outputs;

an optical input mounted on the housing for receiving an optical signal from an optical network;

a receiver optical subassembly (ROSA) for converting the optical signal into a differential electrical signal comprising Rx+ and Rx− components;

a ROSA interconnect for transmitting the Rx+ and Rx− components from the ROSA to the Rx+ and Rx− inputs on the PCB, an electrical connector including: Rx+ and Rx− output leads electrically coupled to the Rx+ and Rx− inputs on the PCB via electrical traces on the PCB for transmitting the Rx+ and Rx− components to the host device, and Tx+ and Tx− input leads for transmitting a differential electrical signal from the host device including Tx+ and Tx− components;

a TOSA interconnect electrically coupled to the Tx+ and Tx− outputs on the PCB via electrical traces in the PCB for transmitting the Tx+ and Tx− components from Tx+ and Tx−;

a transmitter optical subassembly (TOSA) including Tx+ and Tx− inputs electrically coupled to the Tx+ and Tx− outputs on the PCB via the TOSA interconnect for converting the differential electrical signal into an optical signal;

a first inverter for inverting the Rx+ and Rx− components between the ROSA and the Rx+ and Rx− output leads on the electrical connector; and a second inverter for inverting the Tx+ and Tx− components between the TOSA and the Tx+ and Tx− input leads on the electrical connector.

Another aspect of the present invention relates to A method for ensuring compatible optical transceivers are used in an optical link comprising:

a) providing a first transceiver for receiving an original differential electrical signal including Tx− and Tx+ components from a first host device;

b) inverting the Tx− and Tx+ components;

c) converting the electrical signal into an optical signal;

d) transmitting the optical signal over an optical waveguide;

e) providing a second transceiver optically coupled to the optical waveguide for receiving the optical signal;

f) converting the optical signal into a received electrical signal with Rx− and Rx+ components;

g) inverting the Rx− and Rx+ components of the received electrical signal back to the original orientation; and h) transmitting the received electrical signal to a second host device.

BRIEF DESCRIPTION OF THE DRAWINGS

The invention will be described in greater detail with reference to the accompanying drawings which represent preferred embodiments thereof, wherein:

FIG. 1 is an isometric view of a transceiver module in accordance with the present invention;

FIG. 2 is an isometric view of the transceiver module of FIG. 1 from below;

DETAILED DESCRIPTION

The present invention relates to a fiber optic transceiver, which works with existing standard host equipment, using current standard components, and yet is not interoperable with other standardized transceivers. The vast majority of optical communications links in both telecom and datacom applications are carried by fiber optic transceivers. There is a wide array of physical designs, electrical interfaces and optical transmission standards that govern these. In general the approach we describe in this invention is applicable to any pluggable fiber optic transceiver type and any given transmission protocol and format. For the purposes of this disclosure we shall focus the discussion on the SFP+ form factor transceiver for 10 G short wave applications, but the present invention is applicable to any form of transceiver.

Figure 3:
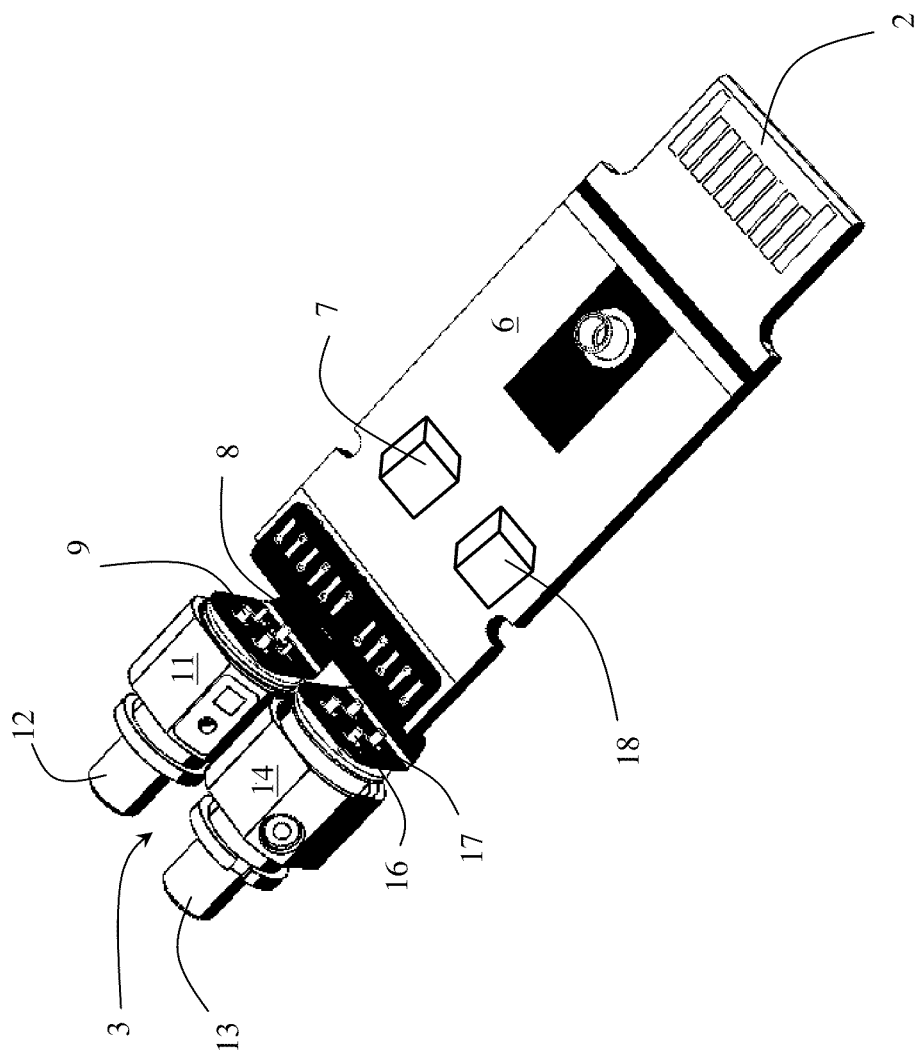
FIG. 3 is an isometric view of the inner structures of the transceiver module of FIGS. 1 and 2.

With reference to FIGS. 1 to 3, the SFP+ transceiver module 1 has an electrical interface 2, e.g. circuit board end connector, for the data path defined by the SFF-8431, which is incorporated herein by reference, and an optical interface 3, e.g. LC duplex optical connector, defined by the IEEE 10 GBASE-SR standard, which is incorporated herein by reference. The optical connector 3 with a duplex LC port extends from one end of a housing 4, and the electrical connector 2 extends from the other end of the housing 4, and enables the transceiver 1 to be hot plugged into a host system.

The data interface SFI signaling is based on differential high speed low voltage logic with AC coupling in the module 1, which means for the transmit direction there is a positive (Tx+) and a negative (Tx−) signal, and for the receive direction there is a positive (Rx+) and a negative (Rx−) signal. The nominal differential signal levels are 500 mV peak-to-peak. The industry multi source agreement (MSA) defined in SFF-8431 (SFP+ MSA document) requires that for a positive input differential voltage, i.e. Tx+ is 500 mV greater than Tx−, the module 1 will transmit a 1 or high level optical signal and for a negative input differential voltage, i.e. Tx+ is 500 mV less than Tx−, the module 1 will transmit a zero or low level optical signal. The same polarity is followed for the Rx path.

Transmit electrical signals Tx− and Tx+ from a host computer device 5 (FIG. 1) enter the transceiver module 1 via the electrical connector 2, and are transmitted across a transmit (Tx) data path to a transmitter optical sub-assembly 11. The Tx data path includes electrical traces in a printed circuit board (PCB) 6, which transmit the transmit electrical signals to a pre-transmission device 7, e.g. laser driver or clock and data recovery device, and from the pre-transmission device 7 to TOSA leads 9. The TOSA leads 9 can be attached to the PCB using one of a variety of TOSA interconnects, e.g. directly to the PCB 6, attached through a leadframe or through a flex circuit 8 (as illustrated). The stub-leads 9 extend outwardly from a TOSA 11, which includes a ferrule 12 extending into the optical connector 3. The TOSA 11 converts the electrical signals Tx− and Tx+ to optical signals and transmits them across an optical link 10 via an optical waveguide, e.g. optical fiber, to a matching transceiver (FIG. 2).

Receiver optical signals from the optical link are received by a ferrule 13 extending from a receiver optical sub-assembly (ROSA) 14, which converts the optical signals into differential receiver electrical signals Rx− and Rx+. The receiver electrical signals Rx− and Rx+ are transmitted across a Rx data path, which includes ROSA leads 16. The ROSA leads 16 can be attached to the PCB using one of a variety of ROSA interconnects, e.g. directly to the PCB 6, attached through a leadframe or, as illustrated, through a flex circuit 17. The receiver electrical signals Rx− and Rx+ travel across the PCB 6, through a post reception device 18, e.g. a post amplifier or a clock and data recovery device, to the electrical connector 2 for transmission to another host device 20.

Figure 4A:
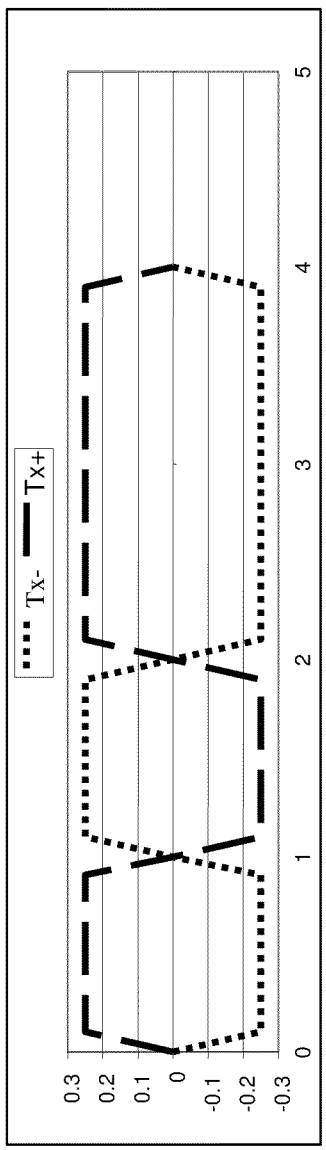
FIG. 4a is a graphical representation of a portion of a differential electrical signal.
Figure 4B:
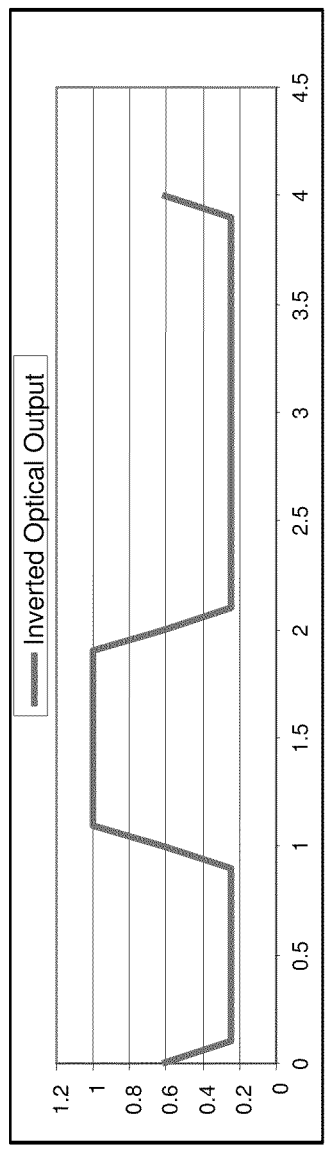
FIG. 4b is a graphical representation of a portion of an inverted optical signal generated by the differential electrical signal of FIG. 4a, in accordance with the present invention.
Figure 4C:
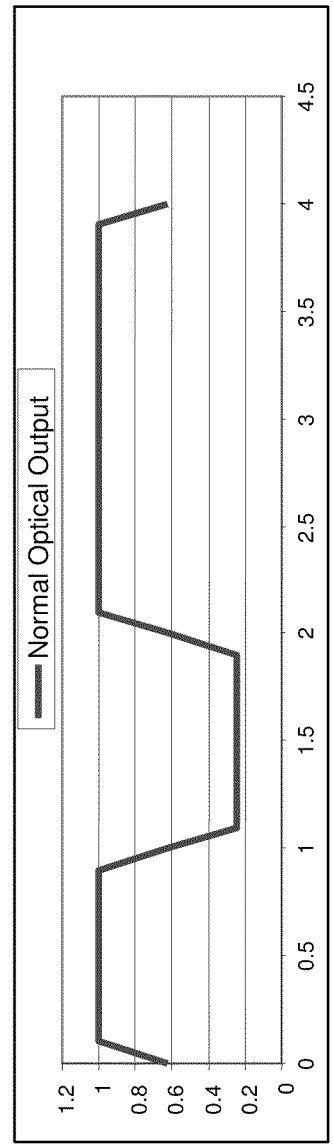
FIG. 4c is a graphical representation of a portion of a normal optical signal generated by the differential electrical signal of FIG. 4a, FIG. 5 is a top view of the transmit and receive data paths of a conventional transceiver without polarity inversion.

In the present invention the polarity of the Tx data path is inverted somewhere between the OSA's 11 and 14 and the electrical connector 2, whereby a positive differential voltage applied between the Tx+ and Tx− results in a zero transmitted at the optical interface represented by a low level optical signal (first bit in FIG. 4*b*), instead of the normal 1, as in FIG. 4*c*. Similarly, for a low level optical signal on the Rx path a positive differential voltage is generated between the Rx+ and Rx− data signals representing a 1. Accordingly, when the signal is passed through to another transceiver, which is also a polarity inverted transceiver, the data is reconstructed, i.e. inverted back, to the correct polarity and the function is transparent to the host systems on either end of the optical link. However, if a standard transceiver were used in combination with a polarity inverted transceiver the data would be inverted by only one of the transceivers and the transmission would not be successful.

Figure 5:
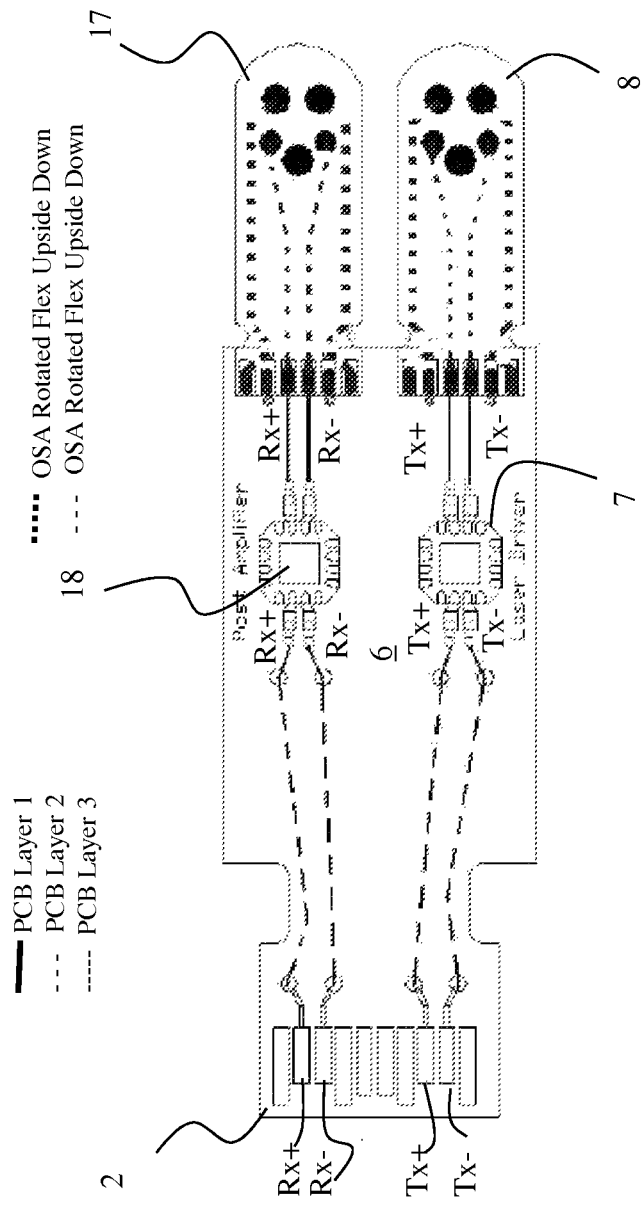

FIG. 5 shows a schematic drawing of an example of a standard configuration for the signal path interconnections in a transceiver, in which the Rx+ and Rx− signals travel from the ROSA 14 to the post reception device 18 via the ROSA interconnect, e.g. flex cable 17, and trace leads on the PCB 6, and then to the connector 2 via additional trace leads. All of the trace leads in the PCB 6 can be in the same layer, e.g. layer 2, since none crisscross. Similarly, the Tx+ and Tx− signals travel from the connector 2 to the laser driver 7 via trace leads in the PCB 6, and then to the TOSA 11 via additional trace leads in the PCB 6 and the TOSA interconnects, e.g. flex cable 8. Again, all of the trace leads can be in the same layer, e.g. second layer, of the PCB 6, since none of the paths of the trace leads have to cross over each other.

Figure 6:
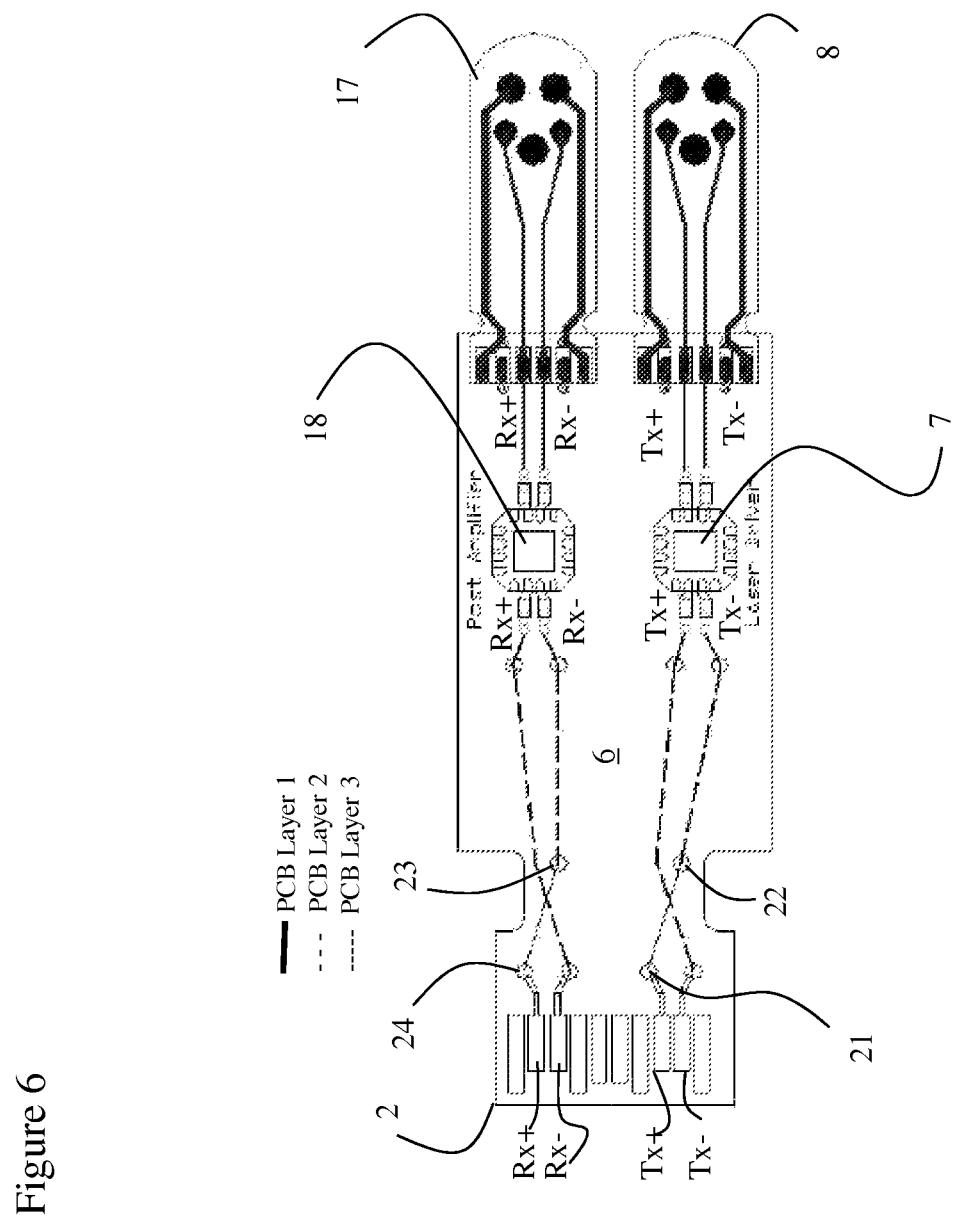
FIG. 6 is a top view of the transmit and receive data paths in accordance with a first embodiment of the present invention with the data path inverted between the host connector and the laser drive and post amp.

A first embodiment of the present invention, illustrated in FIG. 6, is to interchange the differential signals Tx− with Tx+, and Rx− with Rx+ at the electrical input/output of the module 1, i.e. proximate to the electrical connector 2. Accordingly, the printed circuit board (PCB) 6 is provided with an electrical trace connection, e.g. a path via one or more PCB layers, to route the Tx+ signal from the Tx+ input lead on the electrical connector 2 to the Tx− input on the pretransmission device 7, and the Tx− signal from the Tx− lead on the host electrical interface to the Tx+ signal input lead on the pre-transmission device 7.

In the illustrated embodiment the Tx+ signal is routed from the Tx+ input on the electrical connector 2 down to the third layer of the PCB 6, using a first vertical electrical via 21, along the third layer, and then routed up to the second layer of the PCB 6, using a second vertical electrical via 22. The Tx− signal is routed from the Tx− input of the electrical connector 2 along traces in the second layer of the PCB 6. Accordingly, between the electrical vias 21 and 22, the Tx+ and Tx− signal paths overlap, and the Tx+ signal path passes under the Tx− signal path. Both the Tx+ and Tx− signal paths then travel along the second layer of the PCB 6 to the inputs of the pre-transmission device 7. From the pre-transmission device 7, the Tx− and Tx+ signals travel along traces in the upper layer of the PCB 6, which are connected to corresponding leads on the TOSA interconnect, e.g. flex lead 8. Other signal paths are possible using various different layer combinations and vertical vias.

A similar approach can be taken on the Rx data path between the post amp and the electrical connector 2, whereby the electrical signals Rx− and Rx+ are interchanged between the post amp 18 and the Rx− and Rx+ inputs on the host electrical interface 2. The Rx+ signal, which was converted from an optical signal to an electrical signal by the ROSA 14, is transmitted from the ROSA 14 to the post amp 18 via the ROSA interconnect, e.g. the flex cable lead 17, or through a lead frame or a direct attach method, and via the electric traces on the PCB 6. The Rx+ signal, whose original Tx+ signal was interchanged with the Tx− signal in the originating transceiver module at the other end of the optical link, is transmitted from the Rx+ lead on the post reception device 18 to the Rx− output lead on the electrical connector 2 using an electrical trace, e.g. on the PCB 6. The Rx− signal, whose original Tx− signal was interchanged with the Tx+ signal in the originating transceiver module at the other end of the optical link, is transmitted from the Rx− output on the post reception device 18 to the Rx+ output lead of the electrical connector 2 along a trace, e.g. on the PCB 6, thereby correcting the inversion implemented by the transmitting transceiver at the other end of the optical link.

Figure 7:
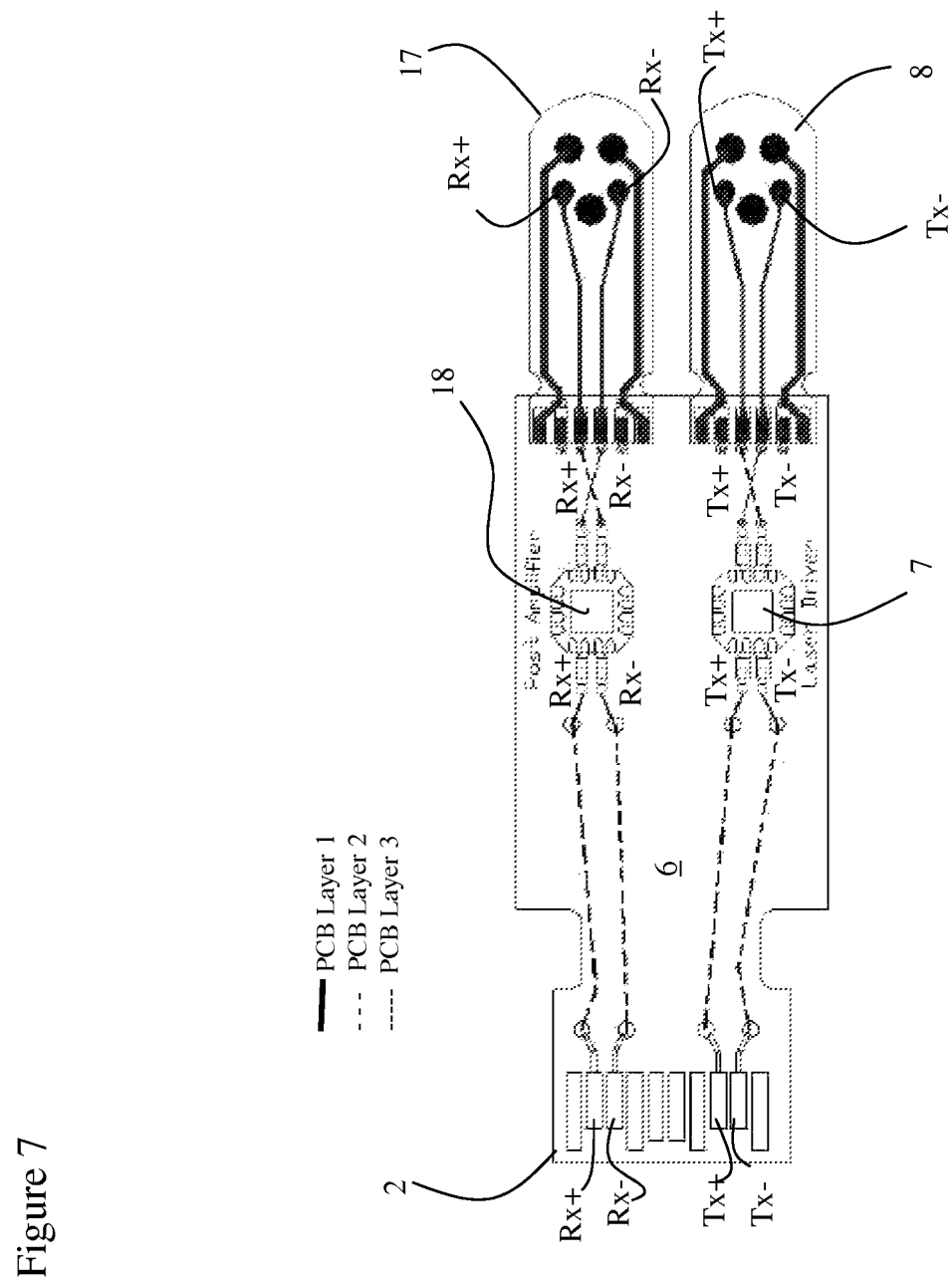
FIG. 7 is a top view of the transmit and receive data paths in accordance with a second embodiment of the present invention with the data path inverted between the OSA flex and the laser driver and post amp.

The second embodiment, illustrated in FIG. 7, is to change the layout on the PCB 6 between the pre-transmission device 77 and the TOSA interconnect, e.g. flex circuit 8, and between the ROSA interconnect, e.g. flex circuit 17, and the post reception device 18. In this approach, for the Rx side, the Rx+ signal from the trans-impedance amplifier (TIA) in the ROSA 14 is routed from the Rx+ output of the ROSA flex circuit lead 17 down a vertical via to the second layer of the PCB 6, along a trace in the second layer to the Rx− input for the post reception device 18. The Rx− signal from the TIA would be routed from the Rx− output of the ROSA flex circuit 17 down a vertical via to the third layer of the PCB 6, along a trace in the third layer to the Rx+ input for the post reception device 18. Accordingly, the Rx+ and Rx− signal paths are inverted, e.g. overlap, whereby the Rx− signal path passes under the Rx+ signal path; however, various other combinations are possible, as long as the Rx− and Rx+ signal paths cross over each other in different layers of the PCB 6 between the flex lead 8 and the laser driver 7, and between the flex cable lead 17 and the post reception device 18.

A similar approach can be taken on the Tx side between the pre-transmission device 7 and the laser, e.g. VCSEL, in the TOSA 11. The electrical connections in the PCB 6 are reversed by coupling the Tx+ input lead on the TOSA interconnect, e.g. flex circuit 8, with the Tx− output lead on the pre-transmission device 7; the Tx− input lead on the TOSA interconnect, e.g. flex circuit 8, with the Tx+ output lead on the pre-transmission device 7, e.g. by using conductive traces in two different layers of the PCB 6.

In the second embodiment, the Rx+ output lead of the post reception device 18 can be electrically connected using a trace in a selected layer, e.g. second layer, of the PCB 6 to the Rx+ lead on the electrical connector 2. Similarly, the Rx− output lead of the post reception device 18 is connected to the Rx− lead on the electrical connector 2 using a trace in the second layer of the PCB 6. The Tx+ and Tx− input leads are also connected to the Tx+ and Tx− leads, respectively, of the electrical connector 2 using traces in a layer, e.g. second, of the PCB 6.

Figure 8:
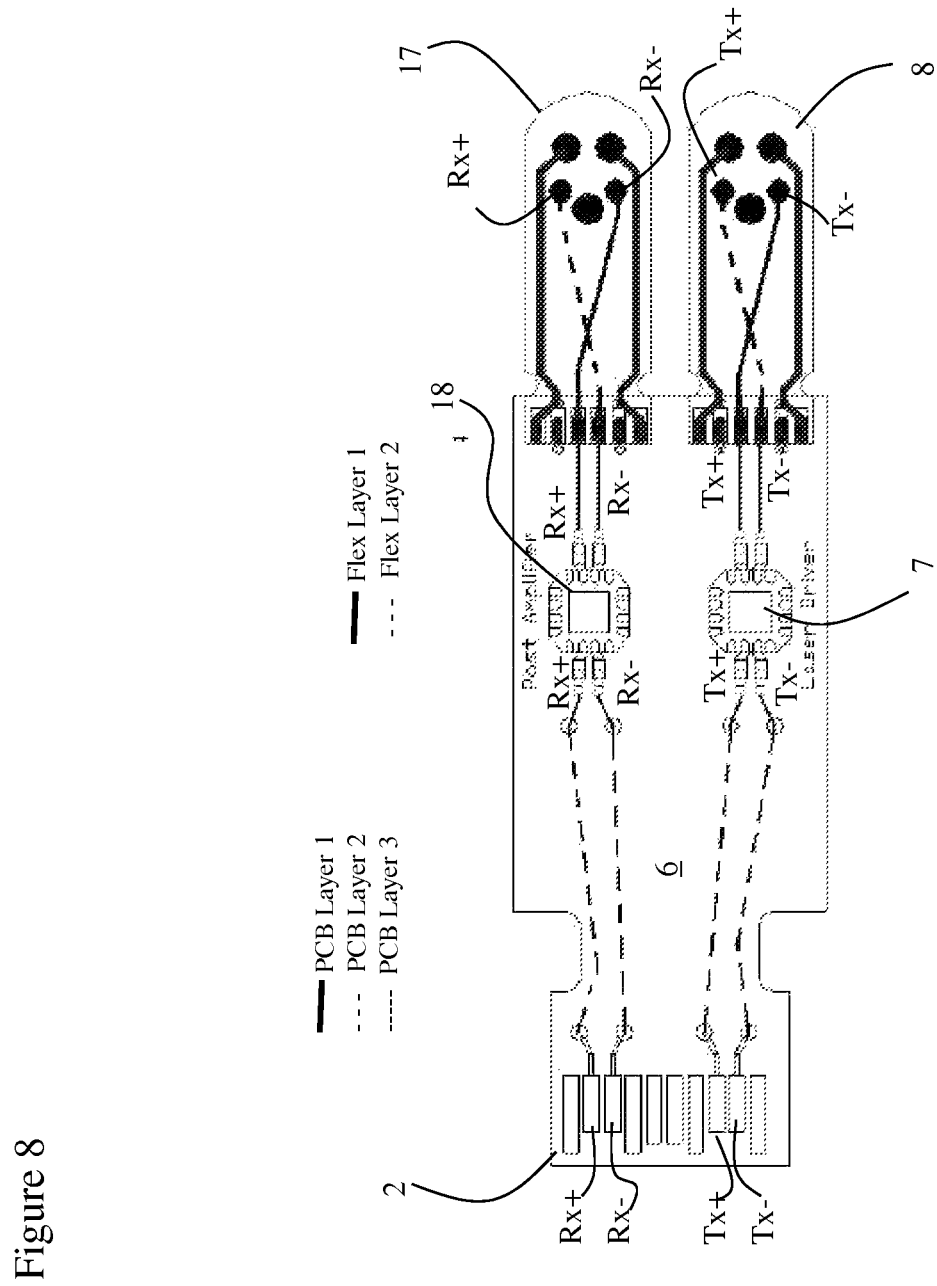
FIG. 8 is a top view of the transmit and receive data paths in accordance with a third embodiment of the present invention with the data path inverted between the OSA's and the PCB.

In the embodiment illustrated in FIG. 8, electrical connections in the Tx and Rx data paths are inverted by swapping the polarity of the connections in the OSA interconnects, e.g. flex cables 8 and 17. In the illustrated example, the polarity inversion is provided by using conductive traces in two different layers of the flex cables 8 and 17. Accordingly, the Tx+ lead on the TOSA 11 is electrically coupled to the Tx− lead on the TOSA flex circuit 8, while the Tx− lead on the TOSA 11 is electrically coupled to the Tx+ lead on the TOSA flex circuit 8.

Similarly, the Rx+ lead on the ROSA 14 is electrically coupled to the Rx− lead on the ROSA interconnect 17, which is electrically connected to the Rx− lead on the post reception device 18, and the Rx− lead on the ROSA 14 is electrically coupled to the Rx+ lead on the ROSA flex circuit 17, which is electrically connected to the Rx+ lead on the post reception device 18. In the illustrated example the Tx and Rx data paths cross over or under one another in different layers of the flex cables 8 and 17. The ROSA 14 can also be rotated, e.g. by 180°, to facilitate alignment of the Rx− and Rx+ leads on the ROSA 14 with the Rx+ and Rx− leads on the ROSA interconnect 17, respectively.

As in FIG. 6, the Tx− and Tx+ leads of the TOSA flex circuit 8 are electrically connected to the Tx− and Tx+ leads of the pre-transmission device 7, respectively using traces in the PCB 6, and the Rx− and Rx+ leads of the ROSA flex circuit 17 are electrically connected to the Rx− and Rx+ leads on the post reception device 18, respectively, using traces in the PCB 6. Moreover, the Tx+ and Tx− input leads of the pre-transmission device 7are connected to the Tx+ and Tx− leads, respectively, of the electrical connector 2 using traces in a layer, e.g. second, of the PCB 6, and the Rx+ and Rx− output leads of the post reception device 18 are connected to the Rx+ and Rx− leads, respectively, of the electrical connector 2, e.g. using traces in a layer, e.g. second, of the PCB 6.

Figure 9:
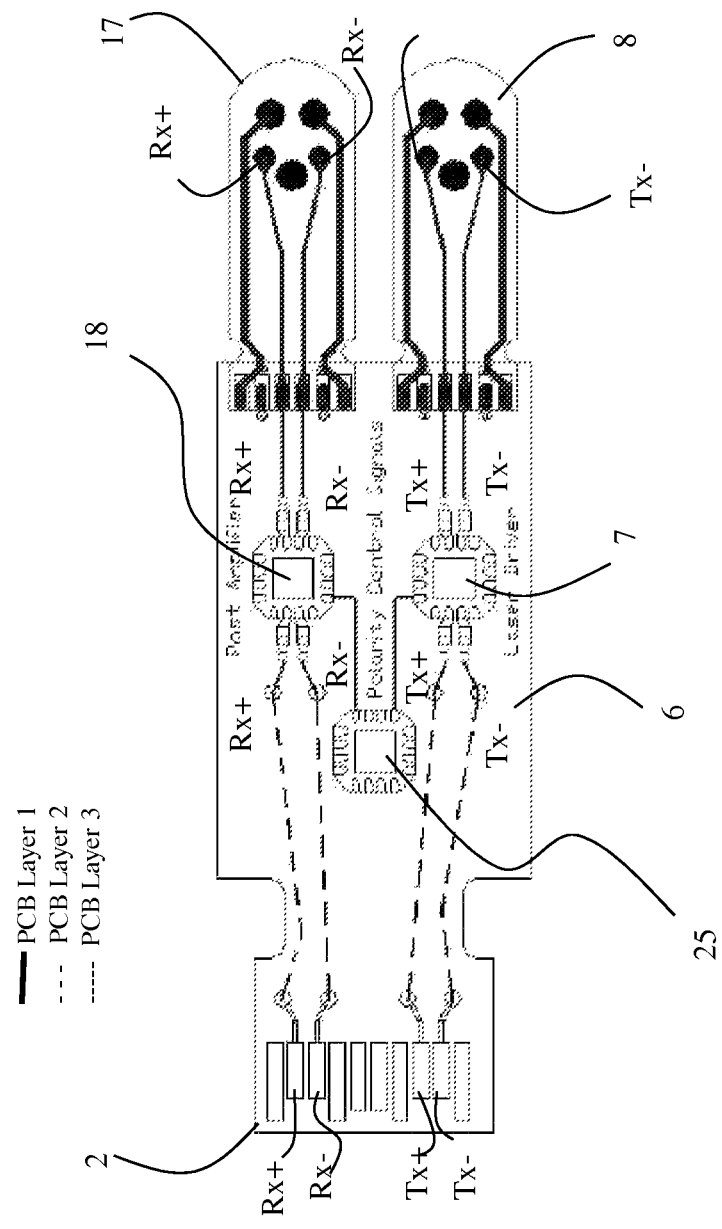
FIG. 9 is a top view of the transmit and receive data paths in accordance with a forth embodiment of the present invention with the data path inverted within the post amp and laser driver circuits.

The third approach, illustrated in FIG. 9, is to build the Rx and Tx datapath polarity inversion capability into the pre-transmission device 7 or the post reception device 18 integrated circuits. The polarity inversion can then be activated by setting an appropriate control signal or control bit in an internal register of a microcontroller 25, which is electrically connected to both the pre-transmission device 7 and the post reception device 18, e.g. the laser driver and the post amp. A specific example is the TI 8501V VCSEL driver, which can invert the polarity of the data signal when the correct bit is set in it's internal register. A similar approach can be used on the Rx side by inverting the polarity within the post amp integrated circuit 18.

Any one of the three different approaches described above can be used to invert the polarity on either the TX or RX data paths in combination with any of the other approaches to invert the polarity on the opposite path. Provided that at least one method is used on each data path and this combination results in polarity inversion on both the TX and RX data paths.

In the embodiments described above a Flex circuit was envisioned between the TOSA and ROSA elements and the transceiver PCB. It is also possible to achieve these embodiments with a lead frame interconnect between the TOSA and ROSA and the PCB or in the case that the TOSA and ROSA leads are directly soldered to the PCB. This last method is sometimes referred to as a direct attach method.

We claim:
1. An opto-electronic transceiver device comprising:
a housing for mounting in a host device;
a printed circuit board (PCB) mounted in the housing including Rx+ and Rx− inputs, and Tx+ and Tx− outputs;
an optical input mounted on the housing for receiving an optical signal from an optical network;
a receiver optical subassembly (ROSA) for converting the optical signal into a differential electrical signal comprising inverted Rx+ and Rx− components;

a ROSA interconnect for transmitting the Rx+ and Rx− components from the ROSA to the Rx+ and Rx− inputs on the PCB;

a first inverter for inverting the inverted Rx+ and Rx− components from the ROSA providing original Rx+ and Rx− components;

an electrical connector including:
Rx+ and Rx− output leads electrically coupled to the Rx+ and Rx− inputs on the PCB via electrical traces on the PCB for transmitting the original Rx+ and Rx− components to the host device, and Tx+ and Tx− input leads for transmitting a differential electrical signal from the host device including original Tx+ and Tx− components electrically coupled to the Tx+ and Tx− outputs on the PCB via electrical traces on the PCB;

a TOSA interconnect electrically coupled to the Tx+ and Tx− outputs on the PCB for transmitting the Tx+ and Tx− components from the Tx+ and Tx− outputs;

a second inverter for inverting the original Tx+ and Tx− components from the Tx+ and Tx− input leads on the electrical connector providing inverted Tx+ and Tx− components; and a transmitter optical subassembly (TOSA) including Tx+ and Tx− inputs electrically coupled to the Tx+ and Tx− outputs on the PCB via the TOSA interconnect for converting the inverted Tx+ and Tx− components into an optical signal, and transmitting the optical signal to the optical network.

2. The opto-electronic transceiver device according to claim 1, further comprising:
a post reception device mounted on the PCB including Rx+ and Rx− inputs electrically coupled to the Rx+ and Rx− inputs on the PCB via electrical traces on the PCB, and Rx+ and Rx− outputs; and a pre transmission device mounted on the PCB including Tx+ and Tx− inputs electrically coupled to the Tx+ and Tx− inputs on the electrical connector via electrical traces on the PCB, and Tx+ and Tx− outputs.

3. The device according to claim 2, wherein the first inverter comprises:
a first data path connecting the Rx+ output lead of the electrical connector with the Rx− output lead of the post reception device; and
a second data path connecting the Rx− output lead of the electrical connector with the Rx+ output lead of the post reception device.

4. The device according to claim 2, wherein the first inverter comprises:
a first data path connecting the Rx+ lead of the electrical connector with the Rx− lead of the post reception device along a first layer of the printed circuit board; and
a second data path connecting the Rx− lead of the electrical connector with the Rx+ lead of the post reception device along a second layer of the printed circuit board;
wherein the first data path crosses over or under the second data path.

5. The device according to claim 2, wherein the first inverter comprises:
a first data path connecting the Rx+ input lead of the post reception device with the Rx− input lead of the ROSA and
a second data path connecting the Rx− input lead of the post reception device with the Rx+ lead of the ROSA.

6. The device according to claim 2, wherein the first inverter comprises:

a first data path connecting the Rx+ input lead of the post reception device with the Rx− input lead of the ROSA along a first layer of the printed circuit board; and
a second data path connecting the Rx− input lead of the post reception device with the Rx+ lead of the ROSA along a second layer of the printed circuit board;
wherein the first data path crosses over or under the second data path.

7. The device according to claim 1, wherein the ROSA interconnect includes the first inverter; and
wherein an Rx− output lead of the ROSA interconnect is connected to the Rx− input lead of the PCB, and an Rx+ output lead of the ROSA interconnect is connected to the Rx+ input lead of the PCB.

8. The device according to claim 1, wherein the TOSA interconnect includes the second inverter; and
wherein a Tx− input lead of the TOSA interconnect is connected to the Tx− output lead of the laser driver, and a Tx+ input lead of the TOSA interconnect is connected to the Tx+ output lead of the laser driver.

9. The device according to claim 1, wherein the ROSA interconnect includes:
a first flex cable including an Rx− output lead connected to the Rx− input of the PCB, and an Rx+ output lead connected to the Rx+ input of the PCB; and
wherein the first inverter comprises:
a first data path connecting the Rx+ input lead of the first flex cable with the Rx− lead of the ROSA along a first layer of the first flex cable; and
a second data path connecting the Rx− input lead of the first flex cable with the Rx+ lead of the ROSA along a second layer of the first flex cable, wherein the first data path crosses over or under the second data path.

10. The device according to claim 1, wherein the TOSA interconnect includes:
a second flex cable including an Tx− input lead connected to the Tx− output of the PCB, and an Tx+ input lead connected to the Tx+ output of the PCB; and
wherein the second inverter comprises:
a first data path connecting the Tx+ input lead of the second flex cable with the Tx− lead of the TOSA along a first layer of the second flex cable; and
a second data path connecting the Tx− input lead of the second flex cable with the Tx+ lead of the TOSA along a second layer of the second flex cable, wherein the first data path crosses over or under the second data path.

11. The device according to claim 2, further comprising a microcontroller for controlling the pre transmission device and the post reception device;
wherein the first inverter includes the microcontroller, which instructs the pre transmission device to invert the Tx− and Tx+ components.

12. The device according to claim 2, wherein the first inverter is comprised within the post reception device.

13. The device according to claim 2, wherein the second inverter is comprised within the pre-transmission device.

14. The device according to claim 2, wherein the pre-transmission device is selected from the group consisting of a laser driver and a clock and data recovery device.

15. The device according to claim 2, wherein the post reception device is selected from the group consisting of a post amplifier and a clock and data recovery device.

16. An optical link for an optical network connecting first and second host devices comprising:

a first opto-electronic transceiver device in accordance with claim 1, connected to the first host device;

a second opto-electonic transceiver device in accordance with claim 1, connected to the second host device; and an optical waveguide network optically coupling the first opto-electronic transceiver device to the second opto-electronic transceiver device.

17. A method for ensuring compatible optical transceivers are used in an optical link comprising:

a) providing a first transceiver for receiving an original differential electrical signal including Tx– and Tx+ components from a first host device;

b) inverting the Tx– and Tx+ components;

c) converting the electrical signal into an optical signal;

d) transmitting the optical signal over an optical waveguide;

e) providing a second transceiver optically coupled to the optical waveguide for receiving the optical signal, f) converting the optical signal into a received electrical signal with Rx– and Rx+ components;

g) inverting the Rx– and Rx+ components of the received electrical signal back to the original orientation; and h) transmitting the received electrical signal to a second host device.

18. The method according to claim 17, wherein the second transceiver includes an electrical connector for connecting the second transceiver to the host device, a post reception device, and a printed circuit board;

wherein step g) comprises:

providing a first data path connecting an Rx+ lead of the electrical connector with an Rx– lead of the post reception device; and providing a second data path connecting an Rx– lead of the electrical connector with an Rx+ lead of the post reception device.

19. The method according to claim 17, wherein the second transceiver includes an electrical connector for connecting the second transceiver to the host device, a post reception device, and a printed circuit board;

wherein step g) comprises:

providing a first data path connecting an Rx+ lead of the electrical connector with an Rx– lead of the post reception device along a first layer of the printed circuit board; and providing a second data path connecting an Rx– lead of the electrical connector with an Rx+ lead of the post reception device along a second layer of the printed circuit board;

wherein the first data path crosses over or under the second data path.

20. The method according to claim 17, wherein the second transceiver includes an electrical connector for connecting the second transceiver to the host device, a post reception device, and a printed circuit board;

wherein step g) comprises:

providing a first data path connecting an Rx+ lead of the post reception device with an Rx– input of the printed circuit board; and providing a second data path connecting an Rx– lead of the post reception device with an Rx+ input of the printed circuit.

21. The method according to claim 17, wherein the second transceiver includes an electrical connector for connecting the second transceiver to the host device, a post reception device, and a printed circuit board;

wherein step g) comprises:

providing a first data path connecting an Rx+ lead of the post reception device with an Rx– input of the printed circuit board along a first layer of the printed circuit board; and providing a second data path connecting an Rx– lead of the post reception device with an Rx+ input of the printed circuit board along a second layer of the printed circuit board;

wherein the first data path crosses over or under the second data path.

22. The method according to claim 17, wherein the second transceiver includes a printed circuit board, a receiver optical sub-assembly (ROSA), and a ROSA interconnect including an Rx– output lead connected to an Rx– input of the printed circuit board, and an Rx+ output lead connected to an Rx+ input of the printed circuit board;

wherein step g) comprises providing a first data path connecting the Rx+ input lead of the ROSA interconnect with an Rx– lead of the ROSA; and providing a second data path connecting the Rx– input lead of the ROSA interconnect with an Rx+ lead of the ROSA.

23. The method according to claim 22, wherein the first transceiver includes a printed circuit board, a transmitter optical sub-assembly (TOSA) and a TOSA interconnect including an Tx– input lead connected to a Tx– output of the printed circuit board, and an Tx+ input lead connected to a Tx+ output of the printed circuit board;

wherein step b) comprises providing a third data path connecting the Tx+ input lead of the TOSA interconnect with the Tx– lead of the TOSA; and providing a fourth data path connecting the Tx– input lead of the TOSA interconnect with the Tx+ lead of the TOSA.

24. The method according to claim 17, wherein the second transceiver includes a printed circuit board, a receiver optical sub-assembly (ROSA), and a ROSA interconnect including an Rx– output lead connected to an Rx– input of the printed circuit board, and an Rx+ output lead connected to an Rx+ input of the printed circuit board;

wherein step g) comprises providing a first data path connecting the Rx+ input lead of the ROSA interconnect with an Rx– lead of the ROSA along a first layer of the first flex cable; and providing a second data path connecting the Rx– input lead of the ROSA interconnect with an Rx+ lead of the ROSA along a second layer of the first flex cable, wherein the first data path crosses over or under the second data path.

25. The method according to claim 17, wherein the first transceiver includes a printed circuit board, a transmitter optical sub-assembly (TOSA) and a TOSA interconnect including an Tx– input lead connected to a Tx– output of the printed circuit board, and an Tx+ input lead connected to a Tx+ output of the printed circuit board;

wherein step b) comprises providing a first data path connecting the Tx+ input lead of the TOSA interconnect with the Tx– lead of the TOSA along a first layer of the second flex cable; and providing a second data path connecting the Tx– input lead of the TOSA interconnect with the Tx+ lead of the TOSA along a second layer of the second flex cable, wherein the first data path crosses over or under the first data path.

26. The device according to claim 17, wherein the first transceiver includes a transmitter optical sub-assembly (TOSA) and a pre transmission device; and wherein step b) includes:

inverting the Tx+ and Tx− components within the pre transmission device.

\* \* \* \* \*